Oct. 25, 1966 W. H. WOODING 3,281,570
ELECTROGAS WELDING
Filed May 12, 1964 2 Sheets-Sheet 1
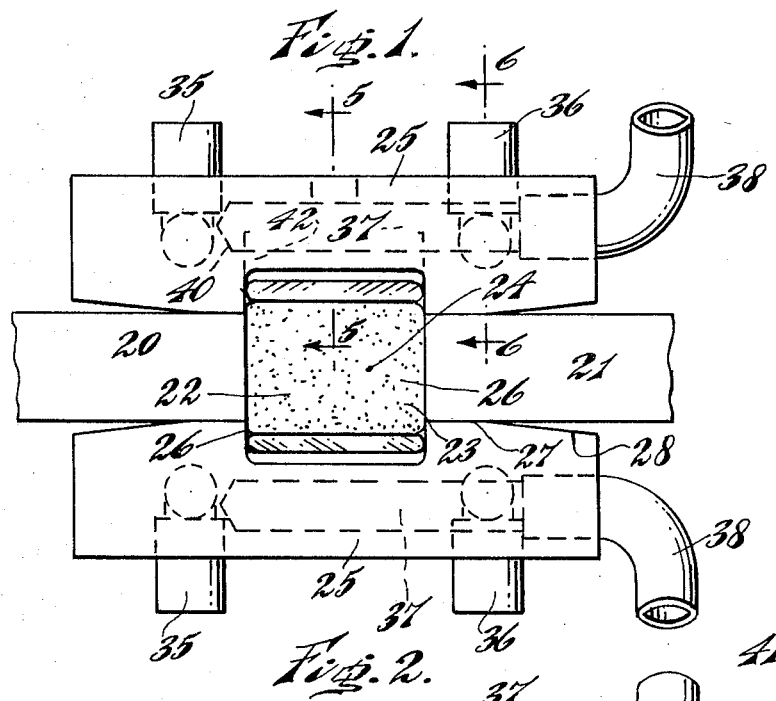
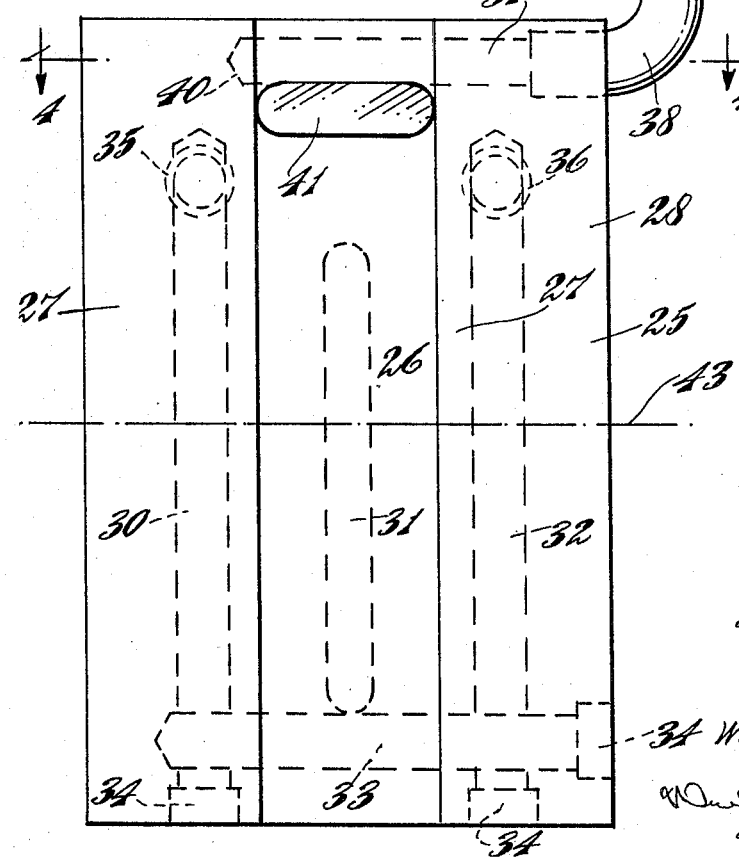
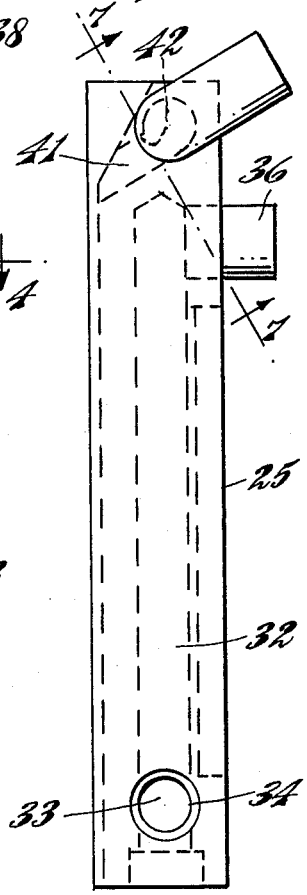
INVENTOR
Walter H. Wooding
BY
ATTORNEYS

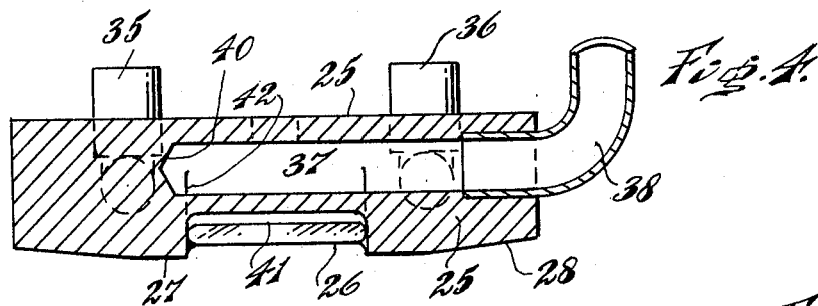
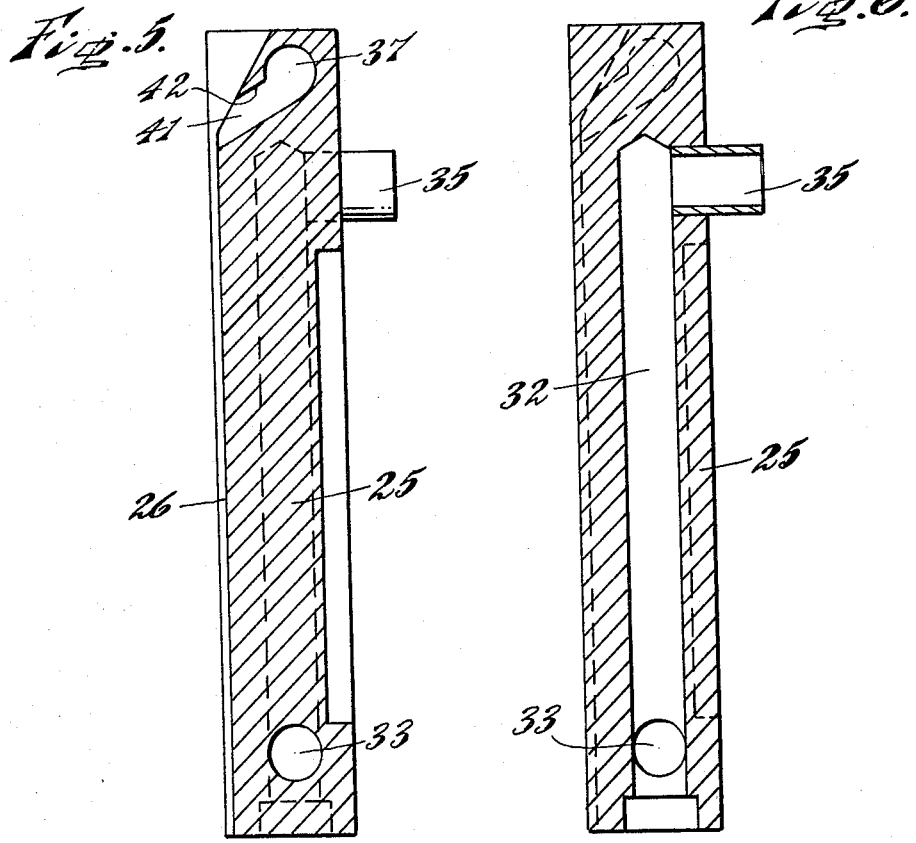
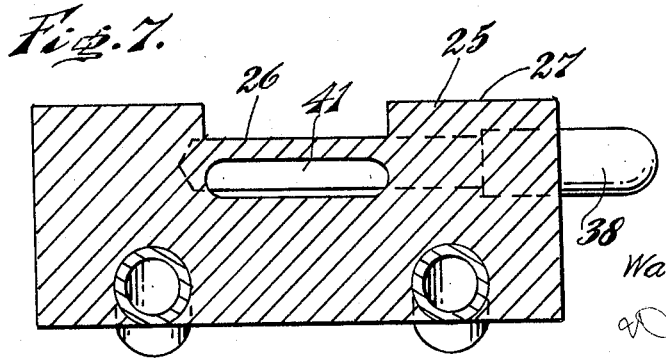

United States Patent Office 3,281,570
Patented Oct. 25, 1966

3,281,570
ELECTROGAS WELDING
Walter H. Wooding, Broomall, Pa., assignor to Arcos Corporation, Philadelphia, Pa., a corporation of Pennsylvania
Filed May 12, 1964, Ser. No. 366,715
4 Claims. (Cl. 219—126)

The present invention relates to electrogas welding, and particularly to improvements in backing shoes for electrogas welding and improvements in methods of electrogas welding.

A purpose of the invention is to more completely shield a weld from the atmosphere by means of gas.

A further purpose is to provide lamellar horizontally elongated streams of protecting gas to protect the top of a weld.

A further purpose is to direct gas on to a weld from horizontally elongated ports provided in the weld shoes.

A further purpose is to expand the protecting gas as it is formed into a lamellar stream downwardly directed on the weld.

A further purpose is to direct a gas stream in a predetermined direction and then abruptly change its direction at right angles and at the same time expand the gas in a horizontally elongated orifice downwardly directed on the weld, suitably from both sides.

A further purpose is to avoid turbulent flow of the protecting gas and to minimize inspiration or entrainment of air in the protecting gas.

A further purpose is to avoid short circuiting of a gas stream which tends to provide unnecessary protection at some location and inadequate protection at other locations above a weld.

A further purpose is to direct a lamellar stream downward on a weld at an angle of approximately 30° below the horizontal.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

FIGURE 1 is a somewhat diagrammatic top plan view of a vertical weld being produced according to the principles of the invention.

FIGURE 2 is a front elevation of one of the welding shoes shown in FIGURE 1.

FIGURE 3 is an end elevation of the welding shoe of FIGURE 2.

FIGURE 4 is a horizontal section of FIGURE 2 on the line 4—4.

FIGURE 5 is a section of FIGURE 1 on the line 5—5.
FIGURE 6 is a section of FIGURE 1 on the line 6—6.
FIGURE 7 is a section of FIGURE 3 on the line 7—7.

Describing in illustration but not in limitation and referring to the drawings:

Electrogas welding is an established process of enclosed electric arc welding in which heat is developed by the electric arc from consumable electrodes and the weld is protected by a protecting gas.

Extensive use is being made of electrogas welding in welding vertical joints between plates, as shown, for example, in FIGURE 1, in which plates 20 and 21 are aligned providing a vertical weld groove 22 in which weld metal 23 is being deposited by an electrode or electrodes at 24 arcing to the weld pool. Backing shoes 25 on the opposite sides engage the plates and confine the weld pool and are suitably raised following the weld groove as welding progresses. For economy in illustration, the plates 20 and 21 have been shown as being relatively thin whereas in many installations much thicker plates may be welded and there is no intention to limit in this respect.

The prior practice has been to project gas at a higher pressure directly into the enclosed space above the weld between the weld shoes. This has caused considerable difficulty, and in my opinion had led to entrainment or inspiration of air by virtue of turbulent flow which has occurred when the gas had entered the atmosphere in the space 26 above the weld and between the shoes.

I have discovered that difficulty with air entrainment can be reduced or prevented, more effective and more economical utilization of protective gas can be made, and the previously encountered tendency of the gas to short circuit can be avoided by modifying the means of introducing the gas. Instead of employing previously used snorkle tubes which directly introduce high pressure gas to the top of the weld, I find that it is decidedly preferable to produce lamellar flow of gas from near the top of the shoes downwardly directed upon the weld.

In accordance with the invention, the gas is expanded prior to introduction into the space above the weld and at the same time formed into a streamlined horizontally elongated stream.

I also find it very desirable to change the direction of gas flow immediately at the time the gas is expanded into the elongated nozzle.

Considering now the drawings in detail, each of the shoes 25 is a generally rectangular block suitably of copper, provided with a vertical recess 26 near the center of the face which permits the weld to be somewhat thicker than the plate, which has plate-engaging faces 27 on either side of the groove 26 and suitably is relieved at 28 remote from the weld so that it will not ride unnecessarily on the plates to be welded.

The shoe is internally drilled to provide bores 30, 31 and 32 which communicate at the bottom with a cross bore 33. Suitably plugs are provided at 34 to prevent leakage.

Near the top, inlet and outlet connections 35 and 36 are provided to the bores 30 and 32.

A suitable cooling medium such as water or brine is circulated through these internal connections.

Near the top of each shoe, a horizontal passage 37 extends connected to a fitting 38 which communicates with a source of protective gas under pressure. The preferred protective gases are argon, helium or carbon dioxide or mixtures of the same, which permissibly may contain minor amounts of other gases.

The passage 37 extends in the direction of the major horizontal axis of the plates being welded and communicates just before it dead ends at 40 with a lateral orifice 41. The orifice 41 is elongated in the horizontal direction and has a cross sectional area that is at least twice and preferably more than twice the cross sectional area of the passage 37. It is suitably a straight orifice downwardly directed at an angle which as shown at 42 is desirably about 30 degrees below the horizontal.

As a result, a lamellar stream of gas is created in the elongated port 41, which is largely free from turbulence and is downwardly directed on the top of the weld. If it does not directly encounter the top of the weld it is downwardly deflected to the top of the weld by the opposite shoe since the level of the weld as shown in FIGURE 2 will suitably be at 43, varying between half-way up and three-quarters of the way up behind the shoe.

Accordingly, it will be evident that lamellar streams of gas are projected on the weld from opposite sides. This provides complete shielding and even distribution of the gas over the weld pool.

It is also observed that this highly desirable lamellar flow occurs notwithstanding the wide variations in rate of gas flow.

It will be evident that gas enters the passage 37 near the top of the weld shoe and immediately is forced to change its direction abruptly 90 degrees and at the same time expand through the elongated downwardly directed port 41. A pressure drop to 50% or below the initial pressure takes place at this point.

The device of the invention is effective notwithstanding that the pressures at which the different gases are started are radically different. For example, in the case of carbon dioxide, the pressure at the regulator is often of the order of 820 p.s.i. and the flow usually maintained is of the order of 40 to 80 cubic feet per hour.

In the case of argon, the gas is started at a pressure of 2400 p.s.i. and the flow is of the order of 30 to 80 cubic feet per hour. Similar flow rates are also employed for helium.

In view of my invention and disclosure, variations and modifications to meet individual whim or particular need will doubtless become evident to others skilled in the art, to obtain all or part of the benefits of my invention without copying the process and structure shown, and I, therefore, claim all such insofar as they fall within the reasonable spirit and scope of my claim.

Having thus described my invention what I claim as new and desire to secure by Letters Patent is:

1. In a vertical welding mechanism, a pair of cooperating shoes adapted to engage opposite sides of the work at a vertical weld to be formed and having gas port means in the shoes for projecting a protecting gas downwardly onto the weld comprising an elongated gas orifice in each shoe having its major dimension horizontally in the direction of the plates to be welded, said orifice being downwardly directed toward the weld and an interior gas connection in the shoe to the orifice on the side remote from the weld extending longitudinally with respect to the major dimension of the orifice and at right angles to the length of the orifice, said gas connection having a cross sectional area which is less than half the cross sectional area of the elongated orifice whereby gas flowing through the connection abruptly changes direction at right angles and simultaneously expands on entering and flowing through the elongated orifice.

2. A welding mechanism of claim 1, in which the orifice is downwardly directed at an angle of 30° below the horizontal.

3. A method of protecting an upwardly exposed weld surface from the atmosphere, which comprises providing a source of protecting gas under pressure, flowing the protecting gas through a passage along one vertical side of the weld, abruptly changing the direction of flow of the gas at right angles to the passage and simultaneously expanding the gas through a horizontally elongated and downwardly directed orifice situated above and along one vertical side of the weld and projecting a lamellar stream of the downwardly directed gas onto the weld surface.

4. A method of protecting the surface of a weld from the atmosphere, which comprises providing a compressed source of gas, flowing the gas from the source through passages along opposite vertical sides of the weld, abruptly changing the direction of flow at right angles to the passages and at the same time expanding the gas stream through horizontally elongated downwardly directed orifices located above the weld surface and along the opposite vertical sides of the weld and projecting lamellar streams of the said downwardly directed protecting gas onto the weld surface.

References Cited by the Examiner

UNITED STATES PATENTS

| | | | |
|---|---|---|---|
| 2,702,846 | 2/1955 | Breymeier | 219—74 |
| 2,928,933 | 3/1960 | Andriola | 219—147 |
| 3,046,386 | 7/1962 | Wooding et al. | 219—126 |
| 3,053,968 | 9/1962 | Gorman et al. | 219—74 |
| 3,134,014 | 5/1964 | Shupp | 219—126 |
| 3,221,134 | 11/1965 | Agnew | 219—126 |

RICHARD M. WOOD, *Primary Examiner.*

ANTHONY BARTIS, *Examiner.*